July 22, 1941.  A. LONGORIA  2,249,906
SURGICAL DEVICE
Filed Sept. 3, 1938  2 Sheets-Sheet 1

INVENTOR.
ANTONIO LONGORIA
BY Bates, Goldrick & Teare
ATTORNEYS

July 22, 1941.  A. LONGORIA  2,249,906
SURGICAL DEVICE
Filed Sept. 3, 1938  2 Sheets-Sheet 2
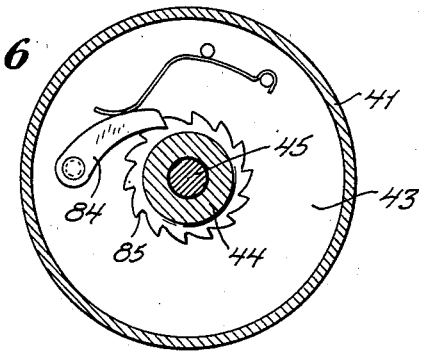
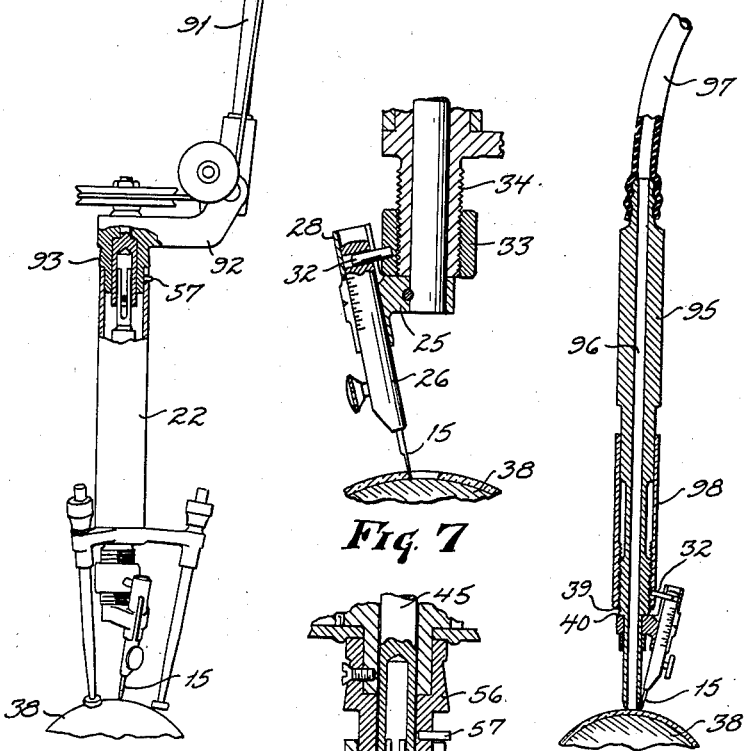
INVENTOR.
ANTONIO LONGORIA
BY Bates, Goldrick, & Teare
ATTORNEYS Patented July 22, 1941

2,249,906

UNITED STATES PATENT OFFICE 2,249,906

SURGICAL DEVICE

Antonio Longoria, Lakewood, Ohio, assignor to Ramon Castroviejo, New York, N. Y.

Application September 3, 1938, Serial No. 228,292

8 Claims. (Cl. 128—305)

This invention relates to surgical instruments and particularly to one that is adapted to make a circular incision at a predetermined angle and to a predetermined depth. The invention has particular application to operations on the eye for transposition of the cornea from one eye to another, particularly when two or more operations must be identical to each other. Operations of this character are useful in restoring sight where the cornea is opaque but where the optical nerve possesses vitality. The operation is usually performed by severing a section of about one millimeter in thickness from the cornea of the patient's eye and transplanting a similarly shaped section from the cornea of a dead eye. The difficulty heretofore has been to sever the two sections with sufficient accuracy that one would fit into the space occupied by the other without causing a defect in the union and in the appearance of the eye upon recovery.

One method heretofore devised for accomplishing this result has been to make a square incision by marking the outline with a tool which has parallel blades. The chief objection to this method however is the fact that the patient, upon recovery, sees through a square opening instead of through a round opening as is the case in normal vision.

An object of my invention is to provide a method and apparatus for accurately severing a round section from the cornea of two different eyes so that one section may be substituted for the other and will fit accurately in position, whereby the patient, upon recovery, will have vision through a round opening and wherein the eye will closely simulate normality.

My invention may be embodied in various forms, all of which may be used for the intended purpose. In this connection, my invention is not limited necessarily to operations on the eye but is applicable for use in removing blemishes or any part of the body structure in a satisfactory and expeditious manner.

Figure 2:
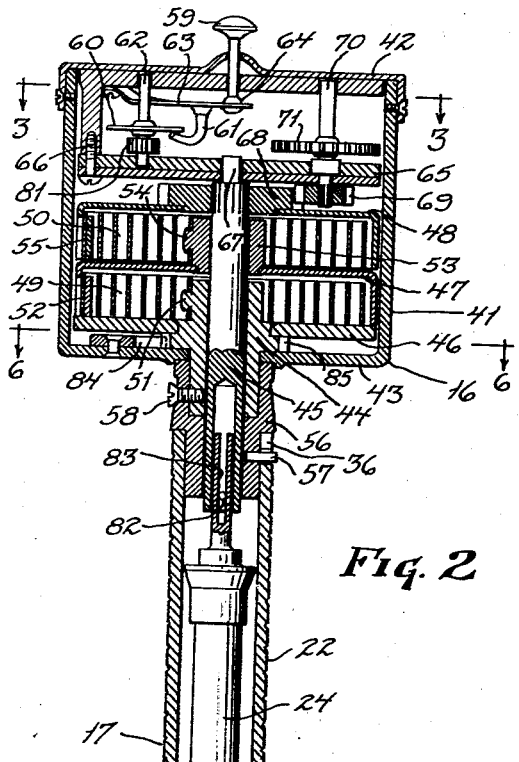
Figure 1:
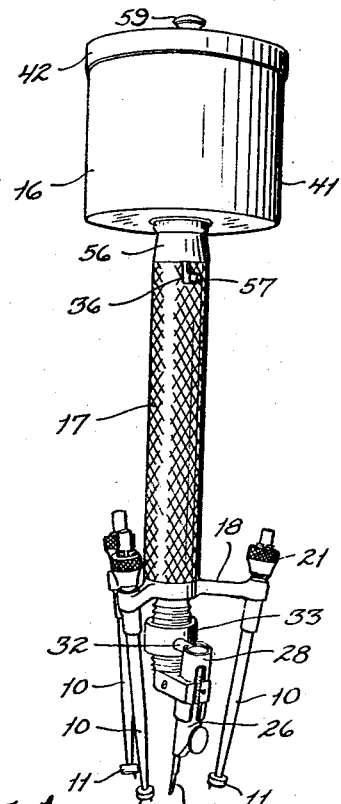
Figure 3:
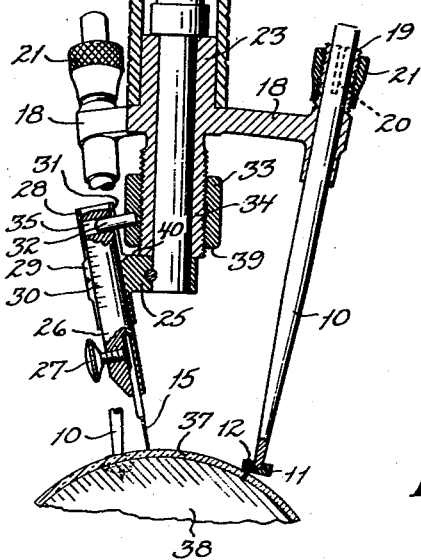
Figure 3:
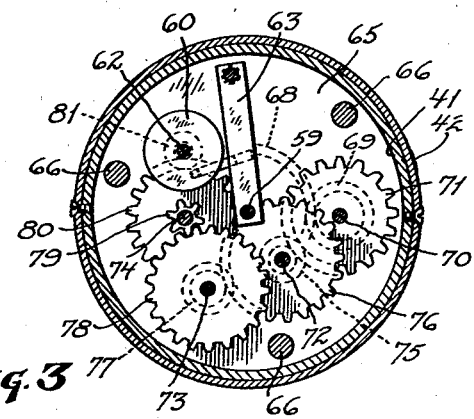

Referring now to the drawings, Fig. 1 is a perspective view of an instrument embodying my invention; Fig. 2 is a vertical section taken through the instrument on a scale larger than that shown in Fig. 1; Fig. 3 is a section taken on the plane indicated by the lines 3—3 in Fig. 2; 4 is a section through a modified form of instrument; Fig. 5 is a side view partly in section through a further modified form of construction; Fig. 6 is a section taken on the plane indicated by the lines 6—6 in Fig. 2; Figures 7 and 8 are fragmentary views showing some of the parts appearing in Fig. 2 in a different position from that illustrated in that figure.

Considering first the illustration of Figs. 1 to 3 inclusive, the instrument has legs 10 in the form of a tripod, the feet 11 of which are adapted to rest upon the surface to be operated. In the case of an eye, the feet rest upon the white of the eye and are provided with prongs 12 which pierce the surface slightly and prevent slippage. The tripod being stationary acts as a support for the cutter 15 that is adapted to be revolved around the axis of the section that is to be severed. The cutter may be revolved by various means such for example as a spring motor, the operation of which is governed by a push button controller that is readily available for the surgeon's use. In this arrangement, the motor unit, designated in general at 16, is detachably connected to the cutter unit, designated in general at 17, so that the cutter and its associated members may be removed for the purpose of sterilization.

The instrument support, as previously stated, is shown as a tripod and in the preferred arrangement, the legs are adjustable longitudinally and rotatably within the arms 18. Additionally, the legs are preferably disposed at an oblique angle with reference to the axis of the instrument so as to provide ample room for clearing the cutter and for firmly engaging the surface that is to be operated. One suitable arrangement for adjusting the legs comprises the use of a hollow extension 19 which is split, as at 20, adjacent its end and is threaded exteriorly to receive a hollow adjusting nut 21. When the nut is loosened, the leg may be shifted longitudinally and rotated but when the nut is tightened, the slot 20 allows the walls of the extension to bind firmly against the leg thereby holding it satisfactorily in any desired position.

The tripod assembly includes a handle or casing 22 which is shown as a hollow tubular member that is rigidly attached to the hub 23. The hub therefore constitutes a bearing for a shaft 24 which extends through the casing and is arranged to have a driving connection with the motor. The lower end of the shaft projects through the hub and is rigidly attached to an arm 25 which in turn is intended to receive the cutter carrier 26. The cutter itself is preferably adjustable longitudinally within the carrier by means of an adjusting screw 27 that is readily accessible from the outer side of the carrier. Additionally, the carrier is adjustable longitudinally of itself within the arm 25 for the purpose of setting the instrument to make a predetermined depth of cut. For the present purpose it is only necessary to state that the arm extension 28, in which the carrier is removably supported, has a slotted opening 29 through which suitable graduations 30 on the carrier may be observed and a slotted opening 31 through which a pin 32 extends. This pin is rigidly attached to a nut 33 that engages a threaded extension 34 of the tripod hub. The outer end of the pin 32 is freely movable within an opening 35 that extends through the carrier.

The function of the connection between the carrier and the nut 33 through the medium of the pin 32 is to fix the limit of the depth to which a cut may be made under the influence of the motor. This is accomplished by turning the nut 33 with reference to the extension 34 until the graduation 30 on the carrier is set for the desired cut. Thus in Fig. 2, the cutter is set to begin a cut upon an eyeball which is designated 38, and in this case the depth of the cut will be limited to the distance between the bottom edge 39 of the nut 33 and the top surface 40 of the arm 25. This limits further rotation of the nut with reference to the arm, and thereby stops the motor automatically.

The mechanism for operating the cutter shaft is shown as a detachable unit that is housed within a cup-shaped casing 41, the top of which is provided with a cover 42. The bottom wall 43 of the casing has a central opening for receiving a ratchet piece 44 which acts as a lower bearing for a drive shaft 45. Additionally the casing supports a base or closure 46 for a spring housing which is shown as a cup-shaped member 47. There are two such housings, the other being indicated at 48 and each contains a spring which provides the motive power for operating the cutter.

I have found it desirable, in order to keep the outside diameter of the casing 41 within reasonable limits, to use two springs in series, indicated at 49 and 50, and thus provide an effective length of spring sufficient to produce the desired number of revolutions. The series connection of the springs is obtained by rigidly connecting the inner end of the spring 49 to the stationary piece 44, at 51, the outer end being connected to the housing 47 at 52. The housing 47, in turn, is rigidly attached to a collar 53 which is free to turn on the shaft 45 while the inner end of the spring 50 is rigidly connected at 54 to the collar 53. The outer end of the spring is connected at 55 to the housing 48 and the housing, in turn, is rigidly connected to the shaft 45, thus, the two springs act in series to rotate the shaft 45 against the reactionary member 44, which in turn is connected to the casing 22. The connection in the preferred arrangement takes the form of an arbor 56 which is provided with a pin 57 that is adapted to enter the slot of the bayonet lock 36 in the casing 22. A screw 58 holds the arbor and the piece 44 firmly together.

To control the speed of the shaft rotation, I provide a brake which is controlled by a push button 59 that is located preferably in the center of the cover 42. The brake takes the form of a disc 60 and a finger 61. The disc is mounted upon a spindle 62 which is adapted to be rotated through a train of gears by the springs 49 and 50 while the finger is shown as depending from a spring arm 63 that is fastened to the inner side of the cover and is so arranged that normally the finger engages the disc with sufficient force to stop rotation of it. The arm 63, however, may be depressed by movement of the push button 59 which in turn is attached at 64 to the arm 63. The train of gears connecting the driving springs to the brake spindle 62 is suitably mounted for assembly purposes as a unit upon a partition 65 which is suitably connected as at 66 to the cover 42. The partition preferably comprises two plates, one of which has openings for receiving the gear spindles, and the other of which serves as a backing for the ends of the spindles. Both plates, however, have a common central opening for receiving the upper end 67 of the drive shaft 45.

The train of gears illustrated comprises a gear wheel 68 which is rigid with the shaft 45 and which operates a pinion 69 on a shaft 70. The shaft 70 carries a gear 71. Between the shaft 70 and the spindle 62, there are additional shafts supporting the intermediate gears and pinions, indicated at 72, 73 and 74 in Fig. 3. The shaft 72 carries a pinion 75 and gear 76; the pinion 75 receiving rotation from the gear 71. The shaft 73 carries a pinion 77 and a gear 78, the pinion receiving rotation from the gear 76 while the shaft 74 carries the pinion 79 and the gear 80, the pinion 79 receiving rotation from the gear 78. Motion is transmitted to the spindle 62 by the gear 80 which meshes with the pinion 81 on the spindle 62. The gearing described is designed to increase the speed progressively so that the disc 60 rotates considerably faster than the shaft 45. Thus a small amount of force is required to arrest its motion.

The winding of the springs may be accomplished first by turning the nut 33 until it engages the shoulder 40. This may be performed by disengaging the motor unit from the cutter unit until the pin 57 clears the end of the casing 22 as shown in Fig. 8, the pin 82 being still within the slot 83, and then manually turning the motor unit with reference to the cutter unit. The purpose of first moving the nut into engagement with the shoulder is to obtain ample space for backing it up along the extension 34 during the subsequent spring winding operation. The motor unit is then pushed inwardly until the pin 57 is locked within the slot and thereupon the springs can be wound merely by holding the cutter unit and turning the motor unit with reference to it. During the winding operation, the pawl 84 engages the ratchet teeth 85 to hold the tension on the springs.

At the completion of the winding operation, the instrument may be set to cut a section of any desired depth. This setting operation may be accomplished by detaching the motor unit from the cutter unit until the pin 57 clears the end of the casing 22 but with the pin 82 occupying the slot 83 as shown in Fig. 8. Thereupon the motor unit may be turned with reference to the cutter unit until the nut 33 is retracted the desired extent, this being discernable by observing the graduations 30 through the slot 29 and thereupon the connections between the two units is again made and the cutter is ready for operation. To position the cutter upon the working surface such as an eyeball, the tripod legs are placed upon the surface and then adjusted as to length and diameter until the point of the cutter is touching the surface to be severed. Then when the push button 59 is depressed the cutter rotates automatically until the nut 33 again contacts the shoulder 40. During this movement the cutter has been severing a circular section by a helical motion and at a constant angle. I have found for example that when the cutter is at an angle of 12 degrees to the axis of the cutter shaft satisfactory results will be obtained in removing a cornea section one millimeter in depth and four millimeters in diameter. I have also found that the tripod legs produce satisfactory results at an angle of 10 degrees to the axis of the cutter shaft. At the completion of the cutting operation the instrument is withdrawn, thus enabling the severed section to be lifted off with a scalpel.

A modification of my invention is illustrated in Fig. 4 wherein the cutter unit is the same as that previously described and wherein the different parts are designated by corresponding reference characters. The motor unit however is of a different nature. Instead of the spring mechanism, I have illustrated an external source of power through an electric motor such as is used for example in the operation of a dental tool. While I have not illustrated the complete arrangement of arms for producing universal movement, together with an electric motor for operating the belt 90, it is to be understood that any such mechanism that is in common use for such purpose may be utilized. The lowermost arm 91 of such mechanism however carries a pulley bracket 92 which in turn has an extension 93 that carries the pin 57 for making the bayonet lock connection with the casing 22.

The modification of Fig. 5 is a hand operated instrument wherein a handle 95 carries the cutter and has a passageway 96 extending therethrough for connection to a suction device through a flexible tubing 97. The function of the vacuum arrangement is to hold the section during the cutting operation and to assist in removal at the completion of the cutting operation. The cutter of Fig. 5 is retained in a holder similar to that previously described but the nut 33 is replaced by a sleeve 98 which is internally threaded to engage a correspondingly threaded portion on the handle 95. It is to be understood that the sleeve 98 therefore carries the pin 32 which connects the sleeve to the cutter carrier. This arrangement limits the depth of the cut by contact between the lower end of the sleeve 98 and the shoulder 40 in the same manner as illustrated in Figs. 2 and 7. During use of the instrument shown in Fig. 5, the lower end of the handle is placed in contact with the cornea or other surface to be severed and is held thereagainst while the cutter is revolved with reference to it.

An instrument made in accordance with my invention is advantageous in that it enables two circular sections to be cut precisely the same in diameter, depth, and angle, thus enabling one to be used with accuracy in place of the other. Additionally the instrument may be set to limit the depth of the cut automatically to a predetermined extent. While the instrument is not limited to operations on the eye, nevertheless as applied thereto, I have reduced the operating time from 40 minutes to six minutes, and I have succeeded in imparting to a patient the ability to see through a round aperture instead of through a square opening. Additionally, I have eliminated the blemish which is present in case of a square opening.

I claim:

1. A surgical instrument comprising, in combination, a handle, a tripod attached thereto, means on the end of the tripod for penetrating the operating surface to hold the instrument against movement with relation thereto during an operation, a shaft journalled within the handle, a cutter, means for rigidly connecting the cutter to the shaft, said means including mechanism for adjusting the cutter longitudinally of the shaft and for limiting turning movement of it with reference to the shaft, and means for rotating the shaft.

2. A surgical instrument comprising, in combination, a cutter, a handle, means for mounting the cutter for rotation around the handle and for holding the cutter at an angle with reference to the handle, said means having a screw and nut connection with the handle to limit longitudinal movement of the cutter with reference to the handle, and a tripod attached to the handle and having means at the foot of each leg thereof for piercing and operating surface and anchoring the instrument against movement with respect to the surface during the cutting operation.

3. A surgical instrument comprising, in combination, a cutter, a support therefor, said support including a tripod, means for adjusting the legs of the tripod longitudinally and rotatably with reference to the support, said legs extending outside the path of movement of the cutter and having means thereon for piercing an operating surface to anchor the instrument against movement with respect to the surface during the cutting operation, and means for rotating the cutter with reference to the support.

4. In a surgical instrument, the combination of a tubular frame, a tripod carried at one end thereof and adapted to engage the surface to be operated upon, a rotary shaft in the casing, and a cutter carried by the shaft and moved in a helical path which is within the points of engagement of the tripod.

5. In a surgical instrument, the combination of a tubular frame, a tripod carried at one end thereof and adapted to engage the surface to be operated upon, a rotary shaft in the casing, a cutter movably carried by the shaft and moved thereby in a circular path within the point of engagement of the tripod, a member threaded on the frame and connected with the cutter to move it longitudinally as it revolves, and means for operating the shaft.

6. In a surgical instrument, the combination of a tubular frame, a tripod carried at one end thereof and adapted to engage the surface to be operated upon, a rotary shaft in the casing, an arm secured to the lower end of the shaft extending radially, a housing carried by said arm in a direction oblique to the axis of the shaft, a cutter carrier slidably mounted in said housing, means for clamping the cutter to the carrier, a nut threaded on the frame, and a connection between the nut and cutter carrier, whereby the cutter is advanced as the shaft rotates.

7. A surgical instrument comprising, in combination, a hollow casing, a shaft journalled therein and held against longitudinal movement, an arm projecting laterally from the shaft below the casing, an inclined housing on the arm, a cutter carrier slidably mounted in the housing, a cutter removably mounted in the cutter carrier, a member in threaded engagement with the casing and connected with the cutter for moving the cutter longitudinally during the rotation of the shaft, and means carried by the casing and projecting beyond the shaft for positioning the instrument on the surface to be operated.

8. In a surgical instrument of the character described, the combination of a holder having positioning means to engage the surface to be operated on, said holder carrying a concentric operating member rotatably mounted, a lateral arm rotatably carried by the instrument some distance above the surface being operated on, an inclined tubular housing carried by said arm with its axis directed towards the surface operated on, a cutter-carrier slidably mounted in the tubular housing, and a cutter carried by the cutter-carrier, the cutter-carrier being drivingly connected to a member threaded on the holder, whereby the cutter is fed into the surface being operated as the cutter travels in a circular path.

ANTONIO LONGORIA.